June 16, 1953
W. J. WOOLLEY
2,642,078
AUTOMATIC HYGROSCOPIC AIR VENT VALVE
WITH CAPILLARY DRAIN TUBE
Filed Nov. 16, 1949
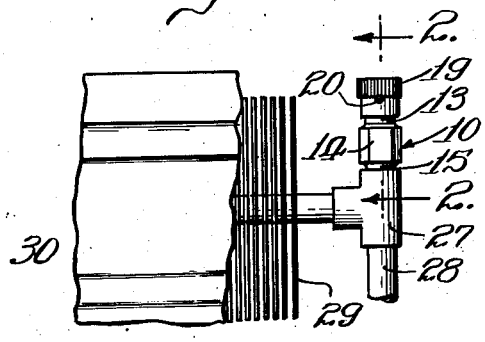
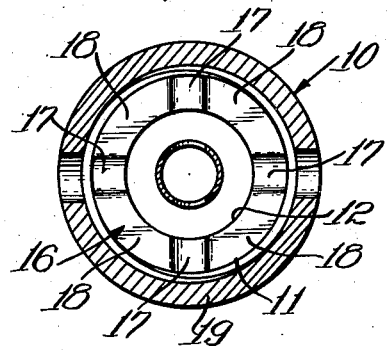
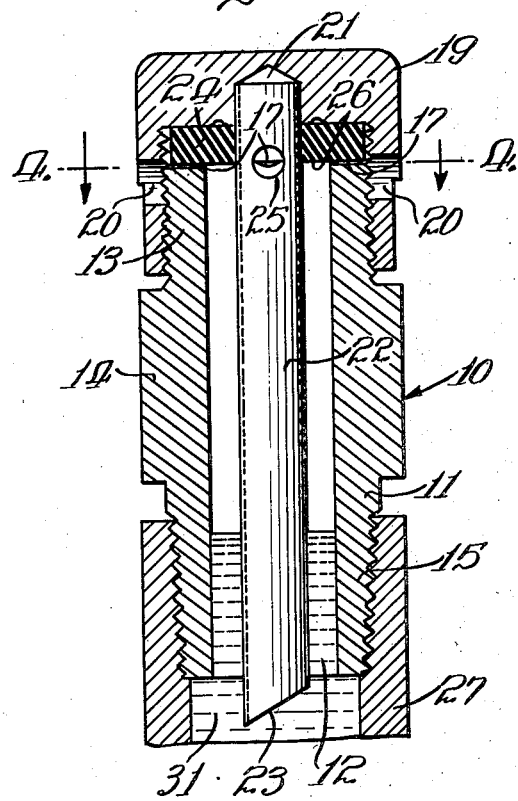
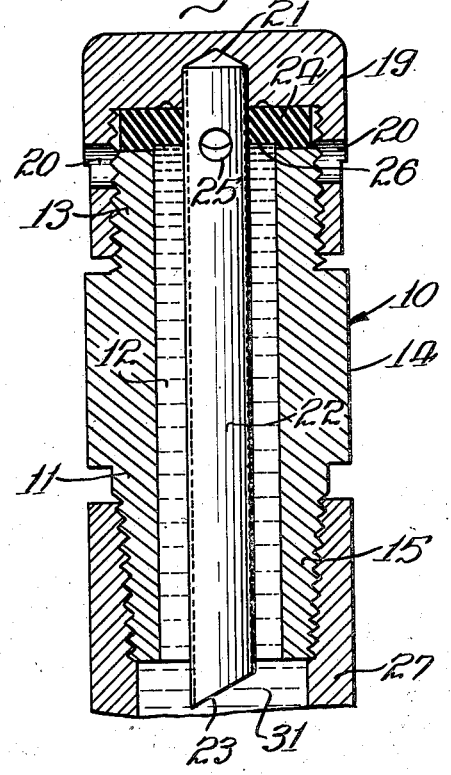
INVENTOR.
William J. Woolley
BY
Kegan and Kegan
Attys.

Patented June 16, 1953

2,642,078

UNITED STATES PATENT OFFICE 2,642,078

AUTOMATIC HYGROSCOPIC AIR VENT VALVE WITH CAPILLARY DRAIN TUBE

William J. Woolley, Chicago, Ill., assignor to Maid-O'-Mist, Inc., a corporation of Illinois Application November 16, 1949, Serial No. 127,683

7 Claims. (Cl. 137—197)

My invention relates to air and gas venting valves for liquid containing systems and the like, and more particularly to improvements in air and gas venting valves of the expansion washer type. Valves of this type are especially well suited for use with hot water heating systems where a pressure is maintained, to vent air and gas from radiators automatically.

Heretofore the most dependable and useful valves of the expansion washer type consisted of an expansion washer positioned relative to a valve seat such that when the washer is dry (and therefore contracted) it is spaced away from the valve seat, thereby permitting air and gas in the system to escape. When water or other liquid in the system rises and contacts the washer, it expands to close upon the valve seat and seal the valve. Experience has demonstrated, however, that this type of valve is subject to two principal objections. First, the valve is inherently slow in acting, because of the large venting area which must be closed. Secondly, after the valve has closed, and the water level falls due to accumulation of air and gas within the valve, drops of liquid remain adhered to the washer. Consequently, in the case of hot water heating systems it may taken between 24 to 70 hours for the washer to dry sufficiently to contract and open the valve, and vent accumulated air and gas to the atmosphere. In this long interval of time, air and gas may accumulate within the radiator or other container in amounts sufficient to reduce greatly the efficiency of the system.

It is a principal object of my invention, therefore, to provide an improved venting valve of the expansion washer type which is quick acting and which greatly reduces the time required for the washer to dry sufficiently to open the valve.

Another object of my invention is to provide a venting valve of the type specified which is easy to install and set, dependable in use, and easily cleaned.

These and other objects of my invention are achieved in the following manner. First, my valve is rendered quick acting by providing the combination of a valve seat, a sealing member engageable with the valve seat and of material which expands when wetted with the liquid of the system of which it is a part, and means positioning the sealing member to engage the valve seat, said valve seat and sealing member being of such configuration that a substantial portion of the flow area of the valve seat is closed by the sealing member when said member is relatively dry. Those contiguous portions of the sealing member and valve seat which are not in contact are contoured to define one or more outlets for air and gas, these outlets being sealed off by the expansion of the sealing member when it is wetted with liquid of the system. Rapid drying of the sealing member is obtained by means of a capillary tube which is positioned within the body of the valve and which is provided with one or more openings closely adjacent to that surface of the sealing member which contacts the valve seat. As air or gas accumulates within the closed valve, the level of liquid within the main body of the valve falls below the level in the capillary tube. When the level of liquid within the capillary tube finally starts to fall, it tends to draw into the tube through the top openings those liquid droplets which remain on the sealing member. In addition, the tube forms a natural drain surface for liquid droplets which collect on the sealing member, thereby greatly accelerating drying of the sealing member.

In order that my invention may be more fully disclosed, reference is had to the accompanying drawing which illustrates one form of apparatus embodying the foregoing and such other principles, advantages or capabilities as may be pointed out as this description proceeds, or as are inherent in the present invention. For purposes of clarity in exposition, the following description is explicit, and the accompanying drawing is detailed, but it is distinctly to be understood that said exposition is illustrative only, and that my invention is not restricted to the particular details recited in the specification or shown in the drawing, except as defined in the appended claims.

In the drawing:

Figure 1 is a fragmentary front elevational view, showing one manner in which a valve embodying my invention may be applied to a liquid containing system;

Figure 2 is a detail side elevational view taken in section on the line 2—2 of Figure 1, showing the position of the parts of the valve when open;

Figure 3 is a view similar to that of Figure 2, except that the valve is shown in the closed position; and Figure 4 is a plan view taken in section on the line 4—4 of Figure 2.

Like reference characters designate like parts in the drawing and in the description thereof which follows.

Referring now more particularly to the drawing, the numeral 10 designates generally an air and gas venting valve embodying the features of my invention, and which is shown in Figures 2 and 4 as including a substantially tubular body 11 having a bore 12 therethrough, a threaded end portion 13, an intermediate hexagonal portion 14, and an end portion 15 threaded for connection to a pipe fitting. The annular end surface 16 of the end portion 13, which is best shown in Figure 4, consists of a plurality of radially disposed grooves 17 separated by the lands 18. These grooves, as shown in Figures 2 and 4, have shallow depth, longitudinally of the body 11, and substantal width, peripherally of the surface 16. An internally threaded cap 19 is adjustable on the threaded end portion 13, and is shown as including a pair of vent holes 20, 20 in that portion which is in threaded engagement with the end portion 13. The cap 19 also includes an opening 21 into which one end of a capillary tube 22 is inserted, and secured in place by swaging, soldering or other fastening means. The capillary tube 22 is sufficiently long so that the tip 23 thereof normally extends beyond the end portion 15 of the body 11. For purposes more fully explained below, the tip 23 of the tube 22 is preferably cut on a bias, i. e. obliquely to the axis of the tube 22.

As best shown in Figures 2 and 3, a sealing member 24, which may be in the shape of a conventional washer, surrounds the upper end of the capillary tube 22, and is of sufficient diameter to overlie substantially all of the end surface 16 and of a thickness, adjacent said surface, substantially in excess of the shallow depth of the grooves 17. The capillary tube 22 includes a pair of openings 25, 25 part of which lie above and part of which lie below the surface 26 of the sealing member 24. The sealing member 24, as mentioned hereinbefore, is of a material which expands when wetted with the liquid circulating in the system, and which contracts to its original configuration upon drying. While a variety of materials may be used for the purposes of my invention, I have found Neoprene, a synthetic rubber-like plastic, to be particularly suitable where the liquid is water, since this material retains its property of expanding and contracting when alternately wetted and dried, for long periods of time, with little deterioration. Fiber and paper are other examples of material from which the sealing member 24 may be formed, although in general fiber and paper dry somewhat more slowly than Neoprene and similar materials.

As illustrative of the manner in which my invention may be used, Figure 1 shows the valve 10 as being connected to a T-fitting 27 in the conduit 28 leading to a hot water radiator 29 of the baseboard type. It will be apparent that my venting valve 10 is equally applicable to other types of hot water heating apparatus, such as convectors and free standing radiators, as well as any other system in which liquid is circulated either as a heating or cooling medium, so long as the sealing member 24 is of material which expands when wetted with the liquid of the system. In addition the valve 10 is applicable to relieving air or gas from myriad other liquid containing or transferring devices.

Advantageously, the valve 10 may be quite small, so that it readily fits within the housing 30 which covers the radiator 29. In practice, the valve 10 is attached at the highest point on the radiator 29 or the piping leading thereto, preferably in the vertical position, as shown in Figure 1. The hexagon portion 14 facilitates screwing the valve body 11 into the pipe fitting. If desired, the valve 10 may also be installed in the horizontal position, without reducing appreciably its effectiveness.

After the valve 10 has been installed, said valve 10 is closed by screwing the cap 19 down tight by hand, following which the system is filled with water. When the system is full, the cap 19 is backed off slowly to open the valve 10, thereby permitting the trapped air to escape so that water 31 fills the radiator 29. To properly adjust the valve 10, the cap 19 should be backed off only to the point where water initially leaks through the vent holes 20, 20 at the rate of approximately ten drops per minute. Water will stop dripping in one-half minute or less, under normal conditions. The valve 10 is then set properly.

The valve 10 then fills with water 31, thereby wetting the sealing member 24 including the thick and wide areas thereof above the grooves 17. This causes the member to expand and fill the grooves 17.

Air or gas, which is continuously forming in the system, now begins to accumulate under some pressure, within the bore 12 of the valve 10. Bubbles of air or gas are prevented from entering the tube 22 both because of its small internal diameter and because of the oblique cut of the tip 23. As air and gas accumulate within the bore 12, the level of liquid within said bore 12 commences to fall. The capillary tube 22, being small in bore, has a higher level of liquid than does the bore 12 of the valve 10. Thus the level of liquid within the tube 22 remains at about the level of the surface 26 of the sealing member 24 for some time after air and gas have started to accumulate within the valve 10. As the water level within the bore 12 recedes, generally small droplets of water remain upon the sealing member 24, but these tend to coalesce into a ring about the upper end of the tube 22. As the liquid level in the capillary tube 22 falls, it tends to draw this accumulated water through the openings 25, 25 and into the capillary tube 22. Drainage from the sealing member 24 is therefore both rapid and efficient. Advantageously, the tube 22 by itself provides a drainage surface, which supplements the action above described in quickly removing substantially all water adhered to the sealing member 24.

By draining all excess water from the sealing member 24 as soon as air or gas begins to accumulate within the valve 10, the sealing member 24 dries rapidly, it usually requiring no more than about one hour for the sealing member 24 to dry sufficiently to uncover the shallow and wide grooves 17, as shown in Figure 2, and permit the escape of air and gas therethrough. As compressed air and gas rush through the grooves 17 traversing the end surface 16 and vent to the atmosphere through the holes 20, 20, water 31 rises within the valve 10. After a short while this water contacts the sealing member 24, causing the latter again to expand and fill the grooves 17, as shown in Figure 3. The shallow depth of the grooves 17 prevents passage of water, while allowing them to act as an effective passageway for air and gas. It requires little expansion on the part of the sealing member 24 to effectively close off the venting area. In one commercial embodiment of my invention, for example, the grooves 17 are of the order of 0.003 inch deep. The total area of the grooves 17, in plain view, preferably comprises less than 40 per cent of the end surface 16. By making the grooves 17 wide and shallow, it is possible to allow rapid flow of air, while at most two or three drops of water escape each time the system is vented. After the sealing member 24 has closed the valve 10, air again begins to accumulate and the foregoing cycle is repeated.

It will therefore be apparent that my valve is unusually quick in its action, as a result of confining expansion and contraction of the sealing member 24 to the grooves 17, rather than around the entire seat defined by the end surface 16. In addition, my construction provides rapid drainage of water from the sealing member to promote rapid drying, whereby the valve 10 is capable of venting the system every hour or so, rather than every 24 to 70 hours, as is usual in the prior art constructions. My valve construction also permits the use of large flow passageways for the liquid in the system, which reduces the possibility of the valve 10 sticking or clogging due to excessive dirt or boiler compound in the line.

Advantageously, the valve 10 may be easily cleaned without disassembling the unit or draining the radiator or other device on which it is installed, merely by backing off the cap 19 a half or full turn from its normal position, and permitting a small amount of the fluid within the system to escape, in the process of which dirt, etc. is flushed from the flow passageways of the valve 10. The cap 19 is then screwed down and set in the proper operating position, in the manner described above. If the radiator or other device on which the valve 10 is installed, is drained or not under pressure, then the cap 19 may be unscrewed and removed from the body 11, and said cap and the elements assembled thereto cleaned by flushing with tap water. It will also be apparent that my valve can be manufactured inexpensively, since all parts are adapted for manufacture on semi- or fully automatic machinery, while the simplicity of the entire device facilitates rapid assembly.

Having thus fully disclosed my novel air and gas venting valve, and demonstrated its utility by reference to a specific embodiment, I claim as my invention:

1. An air and gas venting valve for hot water radiators and the like, comprising: a substantially tubular body, one end portion of which is threaded, the annularly-shaped end surface of said end portion being perpendicular to the axis of said body and having a plurality of substantially radially disposed shallow grooves therein, a threaded cap screwed onto said threaded end portion of said body, said cap having one or more vent holes in that portion thereof normally in threaded engagement with said body, a Neoprene sealing ring in said cap for engagement with said end surface of said body, said cap being adjustable on said body so that said sealing ring, when relatively dry, uncovers said shallow grooves in said end surface to permit flow air and gas therethrough, and expands to fill said shallow grooves when wet, and a capillary tube one end of which extends through said sealing ring and is secured to said cap, the other end of said capillary tube normally extending beyond the other end of said tubular body, said other end of said capillary tube cut obliquely to the longitudinal axis of said tube, said capillary tube being further characterized by an opening positioned partially below and partially above that surface of said sealing ring which contacts said end surface of said tubular body.

2. An air and gas venting valve for hot water heating systems and the like, comprising a substantially tubular body including a valve seat at one end thereof, said valve seat having one or more shallow grooves extending thereacross, a cap on said one end of said body, a capillary tube secured at one end thereof to said cap and extending along the bore of said tubular body, said capillary tube normally extending beyond the other end of said body, a water expandable washer interposed between said cap and said valve seat and surrounding said one end of said capillary tube, said capillary tube having a vent therein positioned partly below and partly above that surface of said washer which contacts said valve seat, and means for adjusting the position of said cap relative to said one end of said body, whereby the clearance between said washer and said valve seat may be adjusted.

3. A valve as defined in claim 2, wherein the tip of said capillary tube which extends beyond said other end of said tubular body is cut obliquely to the longitudinal axis of said tube.

4. An air and gas venting valve for hot water heating systems and the like, comprising: a substantially tubular body including an annular, substantially radially grooved valve seat at one end thereof, a cap on said one end of said body, a water expandable washer interposed between said cap and said valve seat, and means for adjusting the position of said cap relative to said one end of said body, whereby the clearance between said washer and said valve seat may be set; the grooves in the grooved valve seat being shallow in comparison with the thickness of the washer and wide in comparison with the depth of the grooves.

5. An air and gas venting valve for liquid circulating systems and the like, comprising: a tubular valve body one end surface of which defines a valve seat, a cap fitting over said one end of said valve body, a sealing member between said cap and said valve seat, said sealing member being of a material which expands when contracted by said liquid in said system and seals against said valve seat, thereby preventing flow of liquid across said seat, said sealing member as it dries contracting to provide an air and gas vent area between said member and said valve seat, and a capillary tube within said valve body and having an opening closely adjacent to that surface of said sealing member which contacts said valve seat, whereby the accumulation of air or gas within the closed valve establishes a capillary action which drains at least part of the liquid from said sealing member into said capillary tube, thereby accelerating drying of said member.

6. An air and gas venting valve for liquid circulating systems and the like, comprising: a valve seat having a substantially flat surface and at least one indentation traversing said surface, a valve sealing member of material which expands when contacted by liquid, said sealing member having a substantially flat surface engageable with said valve seat, and means positioning said sealing member such that when substantially dry said member is in contact with said valve seat at only said flat surface of said seat, said indentation having a depth which is small in comparison with the thickness of said sealing member adjacent the flat surface thereof, and a width substantially greater than said depth.

7. A gas venting valve for a liquid circulating system and the like, comprising: a valve seat having a substantially flat surface and at least one wide and shallow indentation traversing said surface, a sealing member of substantial thickness compared with the shallowness of said indentation and of material which expands when brought into contact with the liquid of said system, means positioning said sealing member such that when substantially dry said member is in contact with said valve seat at only said flat surface of said seat, and means for draining away from said valve seat and sealing member any liquid which tends to adhere thereto as the level of liquid in said valve falls.

WILLIAM J. WOOLLEY.

References Cited in the file of this patent

UNITED STATES PATENTS

| Number | Name | Date |
|---|---|---|
| 2,153,726 | Scoppola | Apr. 11, 1939 |
| 2,449,838 | Brett | Sept. 21, 1948 |
| 2,460,647 | Miller | Feb. 1, 1949 |